United States Patent [19]

Nakano et al.

[11] 4,313,193
[45] Jan. 26, 1982

[54] TIME DIVISION MULTIPLEX TRANSMISSION APPARATUS

[75] Inventors: Tokutaka Nakano, Kawasaki; Takao Sakata, Yokohama; Masamichi Iwama, Isehara; Takao Isago, Ichikawa, all of Japan

[73] Assignees: Fujitsu Limited; Kokusai Denshin Denwa Co., Ltd., both of Japan

[21] Appl. No.: 101,692

[22] Filed: Dec. 10, 1979

[30] Foreign Application Priority Data

Dec. 28, 1978 [JP] Japan .............................. 53-164984

[51] Int. Cl.$^3$ ............................................. H04J 3/02
[52] U.S. Cl. ........................................ 370/43; 370/41; 370/112
[58] Field of Search ....................... 370/43, 41, 48, 49, 370/91, 112

[56] References Cited

U.S. PATENT DOCUMENTS

| | | | |
|---|---|---|---|
| 3,366,737 | 1/1968 | Brown | 370/49 |
| 3,404,233 | 10/1968 | Mason et al. | 370/48 |
| 3,749,842 | 7/1973 | Poretti | 370/41 |
| 3,989,892 | 11/1976 | Yoshida et al. | 179/18 FC |
| 4,032,709 | 6/1977 | Reisinger et al. | 370/43 |

*Primary Examiner*—Douglas W. Olms
*Attorney, Agent, or Firm*—Staas & Halsey

[57] ABSTRACT

A time division multiplex transmission apparatus which transmits low-speed data and telegraph signals of a maximum of n×m channels as high-speed data in a multiplexed manner based on a time division system. The apparatus also separates received high-speed data into low-speed data and telegraph signals. The time division multiplex transmission apparatus includes m input/output units each comprising: a level converter circuit for converting the subscriber's line level signals of n channels to an internal logic level, a first microprocessor for regenerating the start-stop of n channels of signals and a function to regenerate telex signals, a programmable timer circuit for controlling the interruption time of n channels of signals into the first microprocessor, an interruption control circuit for determining the priority order of interruption of n channel of signals into the first microprocessor, a setting switch for setting a self-address to transfer the data to a time slot to which the high-speed data has been allotted, an address decoder for decoding address signals from the setting switch and a common bus, and a first bus driver receiver for transferring the data from the first microprocessor via the common bus; and a high-speed data processing device comprising: a second microprocessor for multiplexing and separating signals of a maximum of m×n channels, for generating and detecting the frame patterns and keeping frame synchronization, and for generating adresses of m×n channels, an address encoder for encoding address signals of the second microprocessor, and a second bus driver receiver for transferring the data from the second microprocessor into each of said input/output devices via the common bus.

7 Claims, 7 Drawing Figures

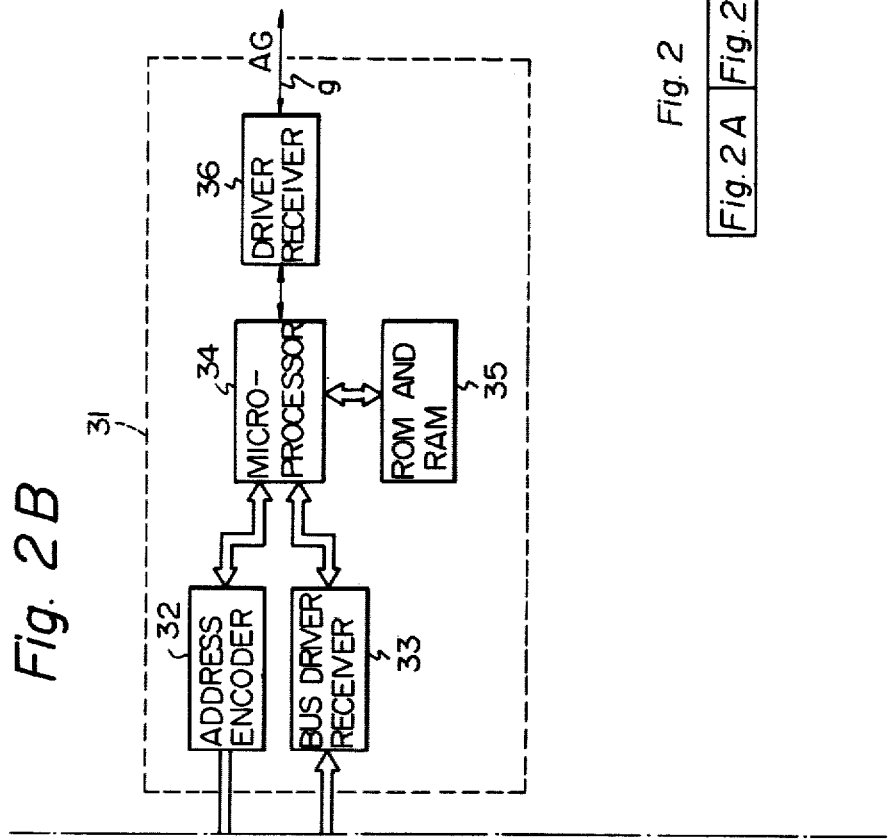

TIME DIVISION MULTIPLEX TRANSMISSION APPARATUS

FIELD OF THE INVENTION

The present invention relates to a time division multiplex transmission apparatus for transmitting a plurality of start-stop data and telegraph signals, having dissimilar speeds, character structures and subscriber's interfaces, in any combination.

BACKGROUND OF THE INVENTION

Systems for transmitting many low-speed data as high-speed data based upon a time division multiplex system can be divided into a character multiplex system for multiplexing the data giving attention to characters, and a bit multiplex system for multiplexing the data based upon bit units. According to the former system, the data are multiplexed after the characters, sandwiched by a start bit and a stop bit, are received. Therefore, there inevitably develops a delay of two to three characters during the transmission and reception. Hence, this system is not suited for applications in which a minimum of delay is required, such as the transmission of telex exchange signals. Accordingly, CCITT is employing a multiplex system based upon bit units, and has already issued a Recommendation R101.

With a time division multiplex transmission apparatus of this kind much attention was given to the economic aspect. Thus it was accepted practice to use a single circuit by concentrating the same processing functions at low-speed channels.

The above-mentioned circuit setup for the conventional time division multiplex transmission apparatus is capable of providing a relatively economical system when the speed of input data and the character constructions are the same or are very restricted, when all of the l channels are to be utilized, or when the reliability of the whole system is not a major concern.

However, it is difficult to construct the start-stop regenerating circuit with hardware when it is necessary to combine the data signals of a speed between 50 to 300 Baud having a character structure of 7.5 to 11 units or when the combination is likely to be changed, as requested by the Alternative B mentioned in the Recommendation R101 of CCITT.

Even when the above-mentioned portion is processed by a software technique, too many channels impose a limitation on the processing speed of a general-purpose processor unless an expensive and a specially designed high-speed processor is used. Furthermore, when the program of just one channel is to be changed, it is necessary to change the whole program.

Furthermore, the increase in the scale of the circuit of a common portion inevitably decreases the reliability of the system. When it is necessary to maintain high reliability, it is necessary to install a double-circuit system causing the scale of the apparatus to be increased and also causing the initial setup cost, with less channel numbers, to become expensive.

OBJECTS AND SUMMARY OF THE INVENTION

An object of the present invention is to provide a novel apparatus which eliminates the defects inherent in the prior art.

Another object of the present invention is to provide a multi-function time division multiplex transmission apparatus, having the type of separate processing based on multiprocessors, which is capable of providing an easier programming means for solving the above-mentioned defects while maintaining increased system reliability, which is cheap in the initial cost, and which provides for sufficient expansion of the system.

To achieve the above objects, the present invention is directed to a time division multiplex transmission apparatus which transmits low-speed data and telegraph signals on a maximum of $n \times m$ channels as high-speed data in a multiplexed manner based on a time division system. The time division multiplex transmission apparatus separates the received high-speed data into low-speed data and telegraph signals and comprises:

m input/output devices, each comprising:

a level converter circuit for converting to the subscriber's line level of n channels of signals into an internal logic level; a first microprocessor for a regenerating the start-stop of n channels of signals and for regenerating telex signals; a programmable timer circuit for controlling the interruption time of n channels of signals into the first microprocessor; an interruption control circuit for determining the priority order of interruption of n channel of signals into the first microprocessor; a setting switch for setting a self-address to transfer the data to a time slot to which the high-speed data have been allotted; an address decoder for decoding address signals from the setting switch and a common bus, and a first bus driver receiver for transferring the data from the first microprocessor via the common bus and vice versa; and a high-speed data processing device comprising:

a second microprocessor for multiplexing and separating signals of a maximum of $m \times n$ channels, for generating and detecting the frame patterns and keeping the synchronization of frame, and for generating addresses of $m \times n$ channels; an address encoder for encoding address signals of the second microprocessor; and a second bus driver receiver for transferring the data from the second microprocessor into each of the input/output devices via a common bus and vice versa.

Further features and advantages of the present invention will be apparent from the ensuing description with reference to the accompanying drawings to which, however, the scope of the invention is in no way limited.

BRIEF DESCRIPTION OF THE DRAWINGS

FIGS. 2, 2A and 2B are block diagrams illustrating a time division multiplex transmission apparatus according to an embodiment of the present invention; and, FIGS. 3A, 3B and 3C are flow charts illustrating the microprocessor software employed for the input/output units illustrated in FIG. 2.

DETAILED DESCRIPTION OF THE PREFERRED EMBODIMENT

Figure 1:
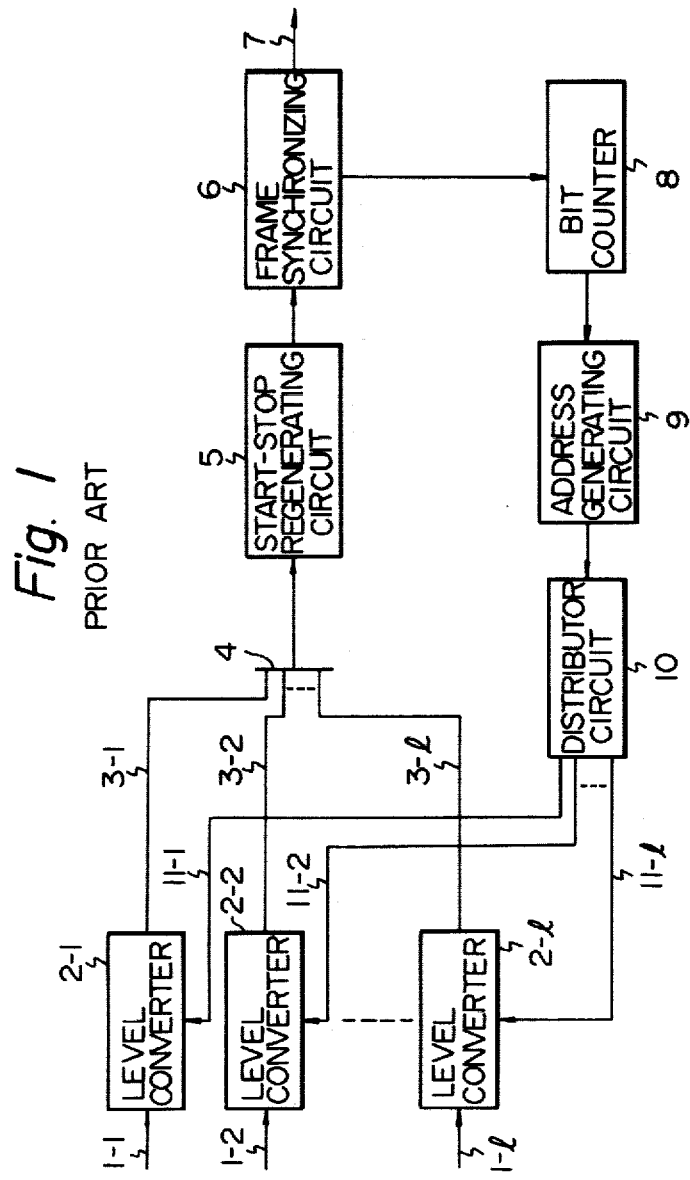
FIG. 1 is a block diagram illustrating a conventional time division multiplex transmission apparatus.

FIG. 1 is a block diagram illustrating the setup of a conventional time division multiplex transmission apparatus. Although FIG. 1 illustrates the transmitting portion only, the receiving portion is also constructed in much the same manner except that the data flows in the reverse direction.

In FIG. 1, reference numerals 1-1, 1-2, ... 1-l denote subscriber's data signals of l channels. The subscriber's level of these signals can be converted to a required level, for example, to a TTL level by the level converter circuits of the individual input/output units 2-1, 2-2, . . . 2-l. The individual output signals 3-1, 3-2, . . . 3-l are collected by an OR circuit 4 and are fed to a start-stop regenerating circuit 5 which regenerates the start-stop of l channels in a time division manner and removes code distortion from the signals.

The output of the start-stop regenerating circuit 5 is fed to a frame synchronizing circuit 6 and is time-division multiplexed. A frame pattern is added to the output of the start-stop regenerating circuit 5 in the frame synchronizing circuit 6. The output of the frame synchronizing circuit 6 is sent as a multiplex signal (AG signal) 7 to a modulator/demodulator (not illustrated).

On the other hand, a bit counter 8 is cleared for each frame synchronizing pulse, counts the bits in the frames, and sends an output to an address generating circuit 9 which generates address information of a channel of the data that is to be taken in. A distributor circuit 10 decodes the address information from the address generating circuit 9, and generates scanning pulses which will be distributed to the individual input/output units 2-1, 2-2, . . . 2-l through lines 11-1, 11-2, . . . 11-l, and the data are read by the scanning pulses.

However, when it is necessary to combine the data signals of a speed between 50 to 300 Baud having a character structure of 7.5 to 11 units or when the combination is likely to be changed, as required by Alternative B mentioned in Recommendation R101 of CCITT, it is a complicated matter to program the start-stop regenerating circuit with hardware.

Figure 2A:
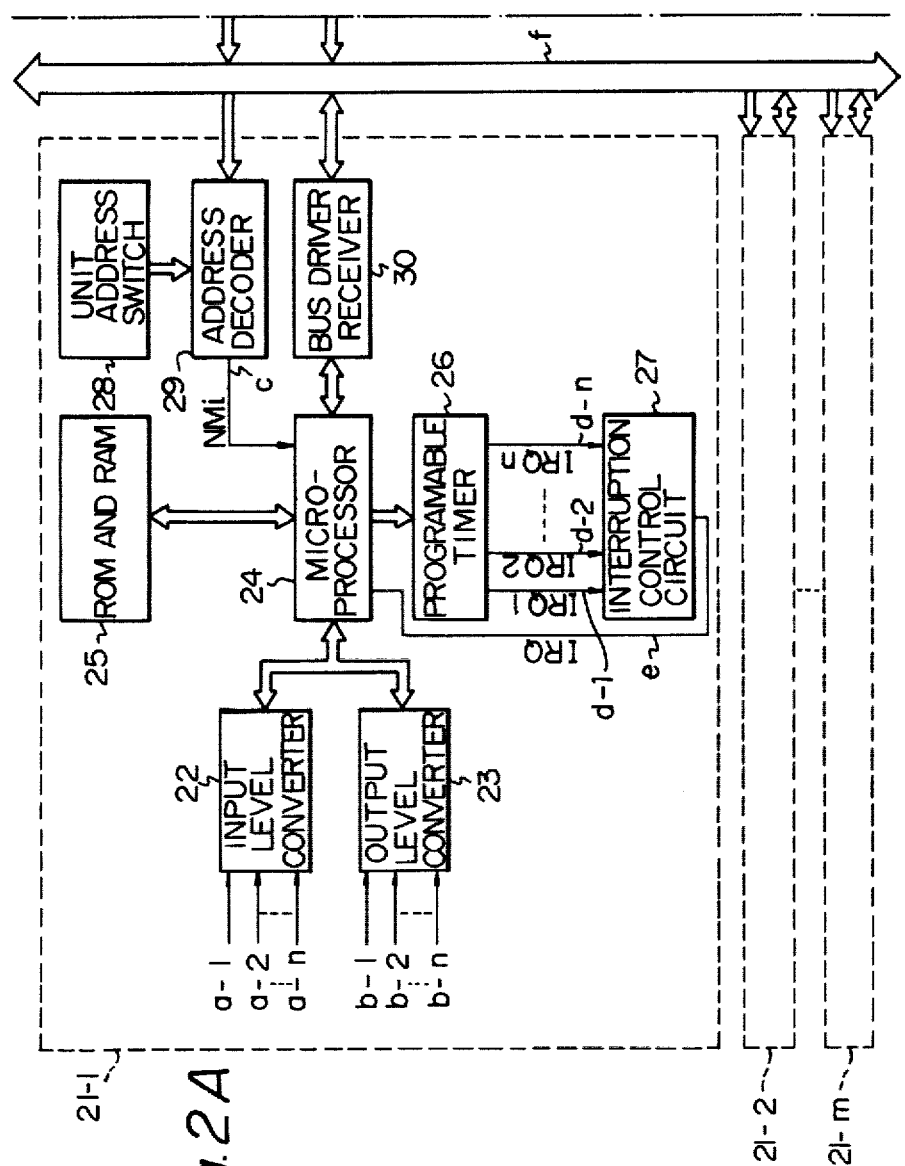

FIG. 2 is a block diagram illustrating a time division multiplex transmission apparatus according to an embodiment of the present invention, in which input/output units 21-1, 21-2, . . . 21-m process n channels of subscriber's line signals. The input/output unit 21-1 is discussed below. Subscriber's signals a-1, a-2, . . . a-n of n channels consisting of bipolar current signals or voltage signals in accordance with Recommendation V28 of CCITT, are sliced on a reference level by an input level converter 22 and are converted into a TTL level. Similarly, an output level converter 23 converts the TTL level into necessary electric signal levels b-1, b-2, . . . b-n of n channels and sends them to the subscribers.

A microprocessor 24 is coupled to a ROM and RAM 25 via an internal bus thereby to execute a program written in the ROM with RAM as main memory elements. From the standpoint of speed, the above process can be sufficiently carried out using general-purpose devices. Sampling clocks of n channels can be set to a programmable timer 26 at the initial moment to correspond to each of the channels at any period. Therefore, even the data other than those of a standard speed, can be easily accommodated.

Reference sampling pulses $IRQ_1, IRQ_2, \ldots IRQ_n$ of 1 to n channels are generated on the output lines d-1, d-2, . . . d-n of the programmable timer 26, and the microprocessor 24 is interrupted at periods of the sampling pulses to write and read the data. However, since the sampling pulses $IRQ_1, IRQ_2, \ldots IRQ_n$ are not in synchronism with each other, there is a probability that other interruption may take place while one channel is being interrupted. Therefore, an interruption control circuit 27 so controls that the next interruption is not accepted until the interruption being executed is finished. Hence, only one of the interruption signals IRQ at a time is applied to the microprocessor 24 via a line e.

On the other hand, the data are transferred between a high-speed processor 31 and the individual input/output units through a common bus f, and the input/output units 21-1, 21-2, . . . 21-m and n channels in each of the units are selected by an address decoder 29. Furthermore, the address decoder 29 sets the above-mentioned selection by a unit address switch 28. Accordingly, the units can be loaded to any place by the address switch 28. Then, the address decoder 29 effects the interruption to transfer the data based on an address in which the address information introduced from the common bus f is in agreement with a selection set by the address switch 28. A signal NMi on the output line c of the address decoder 29 produces such an interruption. When the signal NMi is generated, the microprocessor 24 immediately transfers the data to the common bus f unconditionally. The data are transferred via a bus driver receiver 30.

The high-speed data processor unit 31 is directly coupled to the input/output units 21-1, 21-2, . . . 21-m via common bus f. An address encoder 32 specifies numbers 1 to m of the input/output units and numbers 1 to n of the channels. The transmission and reception of data with respect to the common bus f is effected via a bus driver receiver 33. A microprocessor 34 and ROM and RAM 35 are constructed nearly in the same manner as those of the input/output unit. However, the contents of the ROM's are different.

The interface between the high-speed data processor unit 31 and a high-speed transmission path g is effected by the driver receiver 36, and multiplexed signals (AG signals) are transmitted to a high-speed modem (not shown) or to a data transmission device (not shown) constructed according to the recommendations X21, X21 bis of CCITT.

Figure 3A:
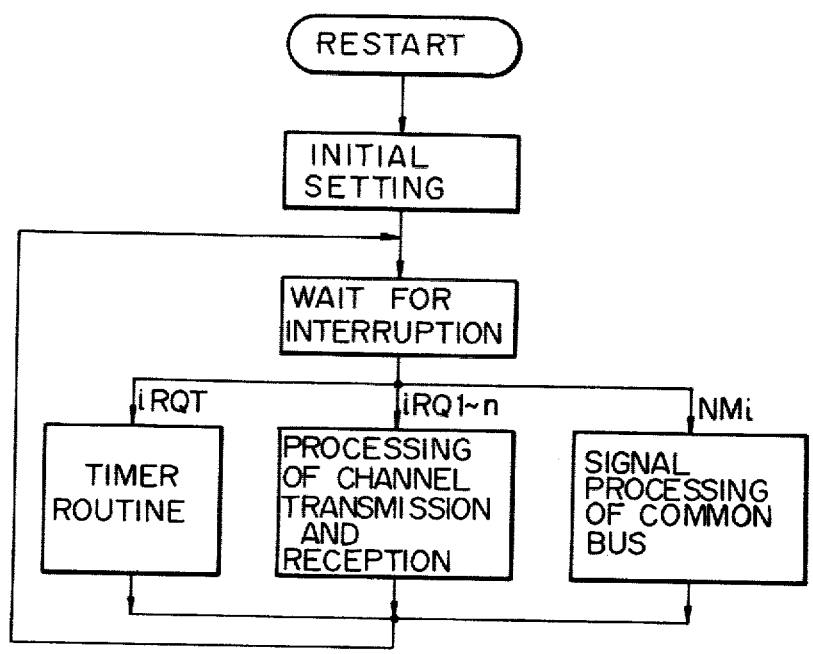
Figure 3B:
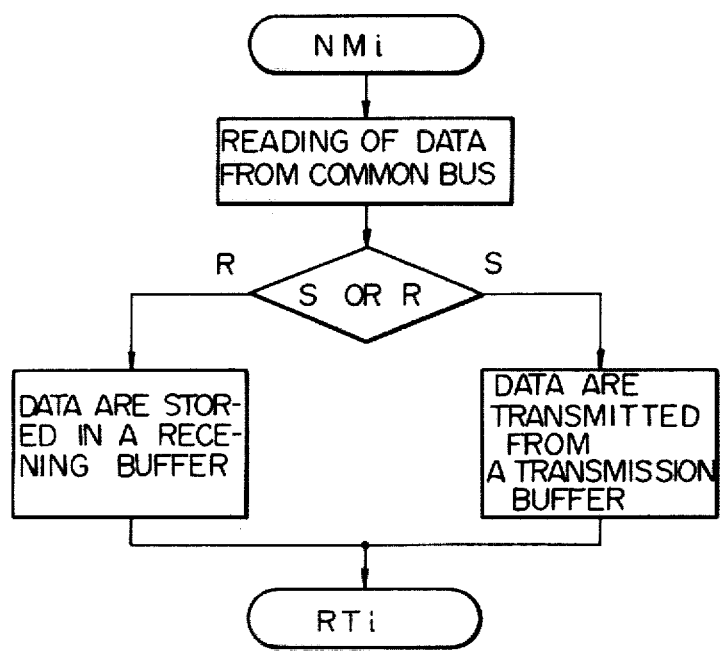
Figure 3C:
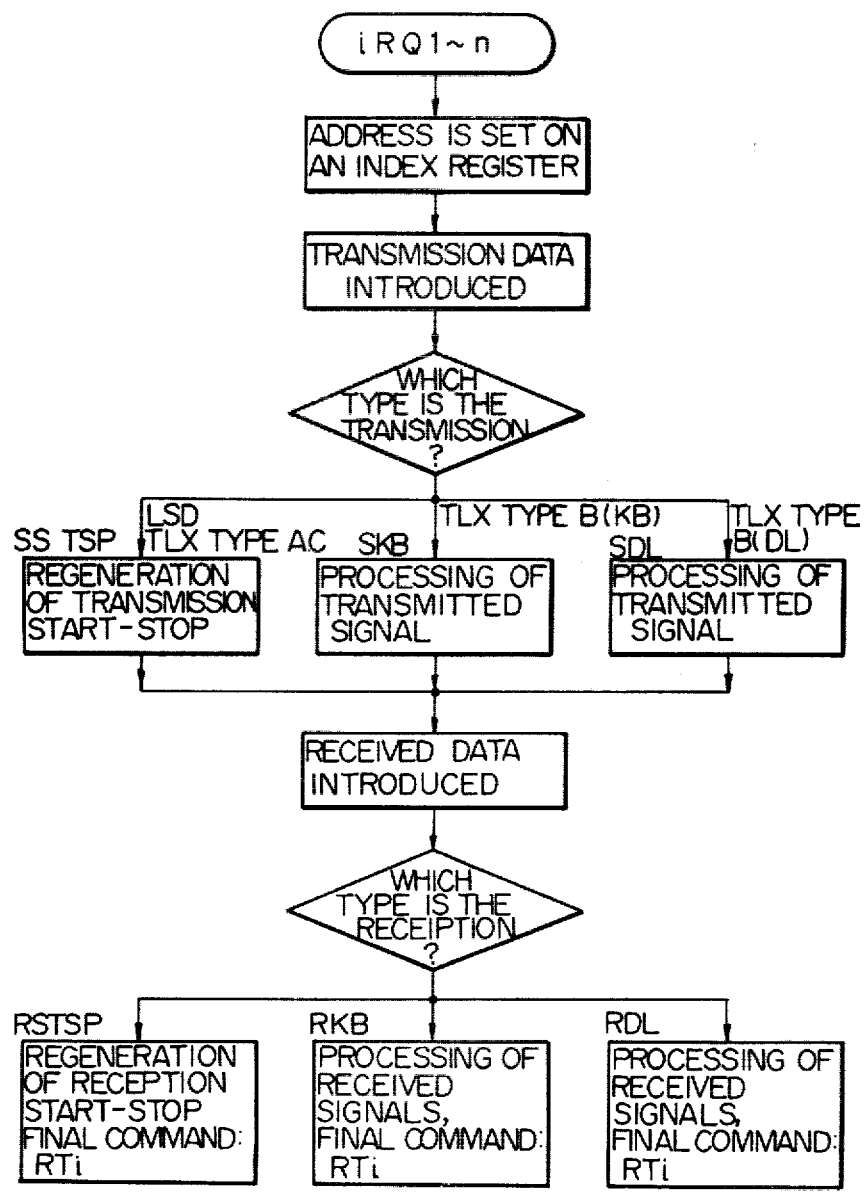

FIGS. 3A, 3B and 3C are flow charts illustrating microprocessor software of the input/output units. FIG. 3A illustrates the flow chart of a main program. Parameters are initially set by the re-start upon the closure of the power supply. During the initial setting, all of the necessary conditions are set to effect the procedure necessary for the subsequent control, and the microprocessor is ready for effecting the interruption.

The general controls are all performed on the basis of interruption. There are three types of interruptions, iRQT (interrupt request of timer), iRQ (interrupt request) 1–n and NMi (non maskable interrupt), having the following priority order:

$$iRQT < (iRQ1-n) < NMi$$

iRQT controls a timer routine which effects the interruption processing for self diagnosis based on various timer processings and on simple program execution. iRQ1–n control transmission/reception processing for each of the channels, which effects the processing according to the developed order of interruption. When the next interruption is developed during the execution of the interruption, the iRQ1–n waits for the finish of the previous interruption processing. NMi is an interruption processing located in the pre-stage of the high-speed data processor unit, and has the highest priority. The interruption by NMi is unconditionally effected.

After the above-mentioned processings have been finished, the microprocessor waits again for the occurrence of the next interruption. The processings are thus effected by judging the developing order of interruption and the degree of priority.

FIG. 3B illustrates a common bus signal processing routine. The data of the common bus are read by the development of interruption NMi. To read the data, address information is read first, and then the transmission S or the reception R is judged. In the case of transmission, the data in the transmission buffer which is a region for temporarily storing the data on the transmission side in the RAM of the microprocessor, are transmitted, and the apparatus returns to the state to wait for the occurrence of interruption RTi. In the case of reception, the data are stored in the receiving buffer which is a region for temporarily storing the data on the receiving side in the RAM of the microprocessor, and the apparatus returns to the state to wait for the occurrence of the interruption.

FIG. 3C illustrates a transmission/reception processing routine for each of the channels. The interruptions of n channels develop in the interruption iRQ1-n; however, it is not certain which channel may develop the interruption. When the interruption develops, an address is set in an index register in the microprocessor. Then, the transmission data are introduced. The types of transmission are determined here, and are divided into three types of flows. The first flow is for the cases of an exclusively provided line LSD and telex signals of the type A and type C; the start-stop regeneration (SSTSP) is effected on the transmission side. The second flow is for the case of the telex signals of the type B which are keyboard signals KB. In this case, the transmission signals are processed SKB. The third flow is for the case of the telex signals of the type B which are dial pulses DL. In this case, the transmission signals are processed SDL.

After these processings are finished, the apparatus switching to the receiving mode and introduces the received data. The type of reception is judged and is divided into three types of flows. The first flow is for the case of start-stop signals. In this case, the start-stop regeneration (RSTSP) is effected on the receiving side, and the apparatus returns to the state to wait for the occurrence of interruption (RTi) as a final command. The second flow is for the case of keyboard signals in telex signals of the type B. In this case, the received signals (RKB) are processes, and the apparatus returns to the state to wait for the occurrence of interruption as a final command. The third flow is for the case of dial pulses in telex signals of the type B. In this case, the received signals (RDL) are processed, and the apparatus returns to the state to wait for the occurrence of interruption as a final command.

According to the time division multiplex transmission apparatus of the present invention mentioned in the foregoing, the processors are separately arrayed in the input/output units in order to increase the reliability of the whole system as well as to provide new functions that so far have not been anticipated without needing additional hardware. For example, the software contemplated by the present invention makes it easy to regenerate the start-stop of data, to process the telex signals in a mixture of the types A, B, C and D, and to remove code distortion from the dial pulses or keyboard signals of the type B for each of the channels in any combination. The present invention also makes it easy to monitor the interference in the subscriber's lines, to loop back the channels, to hold the polarities of the subscriber's line signals when interference has developed in the high-speed transmission lines, to check the parity of data having parity bits, to transmit the control signals in-band during the off-line period, to generate test signals, to detect excess distortion in the subscriber's data, to detect speed errors, and to diagnose the fault for each of the units.

The result of using the processors for the high-speed data processing apparatus are set forth below. The Recommendation R101 of CCITT discloses quite different multiplex systems, i.e., Alternative A and Alternative B. Thus, it is necessary to provide functions corresponding to both systems so that connection can be made to any remote terminals. According to the conventional hardware-oriented systems, at least two kinds of hardware are necessary. According to the software-controlled system of the present invention, however, a single kind of hardware suffices. Moreover, the remote loop back codes can be generated without requiring additional hardware. The increase in the number of functions is accompanied by the increase in the number of steps for the program, and hence the ROM capacity must be increased. This, however, does not present any great burden in regard to the external sizes and costs, owing to the recent advances in LSI technology. The main functions of the microprocessors used for the high-speed data processing apparatus are: multiplexing the low-speed data into any high-speed time slots and separating them; to generating and detecting frame patterns and keeping the synchronization of the Alternative A frame and the Alternative B frame; generating and detecting remote loop back codes; self-diagnosing the units; detecting errors in frame bits on the high-speed transmission path; and counting the bits.

Thus, according to the time division multiplex transmission apparatus of the present invention, multiplex processing functions are arrayed in a separate manner to more economically assemble the apparatus while maintaining increased reliability, presenting an increased number of functions and enabling the functions to be changed without the need for changing the hardware. Moreover, the speed for processing high-speed data can be increased to expand the scale of the system simply by increasing the number of the input/output units. Consequently, according to the present invention, the input/output units are highly sophisticated so that the diversified requirements of the subscribers can be sufficiently satisfied.

What is claimed is:

1. A time division multiplex transmission apparatus for transmitting subscriber's line level signals such as low-speed data and telegraph signals of a maximum of $n \times m$ channels, where n and m are integers, as high-speed data in a time division multiplexed system, and for separating received high-speed data into low-speed data and telegraph signals, said time division multiplex transmission apparatus comprising:

a common bus for providing address signals;

m input/output devices, each of said m input/output devices comprising:

a level converter circuit for converting the subscriber's line level signals of n channels into an internal logic level;

a first microprocessor, operatively connected to said level converter circuit, for regenerating the start-stop of n channels of signals and for regenerating telex signals;

a programmable timer circuit, operatively connected to said first microprocessor, for controlling the interruption time of n channels of signals into said first microprocessor;

an interruption control circuit, operatively connected between said programmable timer circuit and said first microprocessor, for determining the priority order of interruption of n channels of signals into said first microprocessor;

a setting switch for setting a self-address to transfer data to a time slot to which the high-speed data have been alloted;

an address decoder, operatively connected to said setting switch and the common bus, for decoding address signals from said setting switch and the common bus; and a first bus driver receiver, operatively connected to said first microprocessor and said common bus, for transferring the data from said first microprocessor via said common bus; and a high-speed data processing device comprising:

a second microprocessor for multiplexing and separating signals of a maximum of m×n channels, for generating and detecting frame patterns and for keeping a synchronization frame, and for generating address signals of m×n channels;

an address encoder, operatively connected to said second microprocessor and the common bus, for encoding the address signals of said second microprocessor; and a second bus driver receiver, operatively connected to said second microprocessor and said common bus, for transferring the data from said second microprocessor into each of said input-/output devices via said common bus.

2. A time division multiplex transmission apparatus according to claim 1, wherein said priority order of interruption of n channel of signals into said first microprocessor is $$iRQT < (iRQ1-n) < NMi$$

wherein iRQT denotes an interrupt request of timer signal generated by said programmable timer circuit, iRQ1-n denotes interrupt request signal of channels 1 through n generated by said programmable timer circuit and NMi denotes a non maskable interrupt signal generated by said address decoder.

3. A time division multiplex transmission apparatus according to claim 2, wherein said first microprocessor is operatively connected to a first RAM and wherein when the interruption signal NMi occurs, said first microprocessor reads the data from said common bus, determines whether said data is transmission data or reception data, and when said data is transmission data said data which is stored in a transmission buffer on the transmission side in said first RAM is transmitted and the apparatus returns to the state to wait for occurrence of interruption, and when said data is reception data, said data is stored in the receiving side in said first RAM and the apparatus returns to the state to wait for occurrence of the interruption.

4. A time division multiplex transmission apparatus according to claim 2, wherein said first microprocessor includes an index register, wherein when the interrupt request signal iRQ1-n is generated, the address of said interruption is set in said index register of said first microprocessor and the transmission data is introduced in said first microprocessor and said transmission data is divided into first, second and third flows;

said first flow comprising an exclusively provided line LSD and types A and B telex signals;

said second flow comprising type B telex signals which are keyboard signals KB;

said third flow comprising type B telex signals which are dial pulses DL;

wherein for the first flow, the start-stop regeneration is effected on the transmission side; for the second flow, the transmission signals KB are processed; for the third flow, the transmission signals DL are processed;

wherein when these processings are finished, the apparatus acquires the receiving mode and introduces the received data, the received data are divided into a fourth flow for start-stop signals, a fifth flow for keyboard signals in type B telex signals, and a sixth flow for dial pulses in type B telex signals;

wherein for the fourth flow, the start-stop regeneration is effected on the receiving side; for the fifth flow, the received signals KB are processed; and for the sixth flow, the received signals DL are processed; and wherein when these processings are finished, the apparatus returns to the state to wait the occurrence of interruption as a final command.

5. A time division multiplex transmission circuit for transmitting subscriber's signals such as low-speed data and telegraph signals from a maximum of N by M channels, where N and M are intergers, as high-speed data, and for receiving high-speed data and separating said received high-speed data into low-speed data and telegraph signals, said time division multiplex transmission circuit comprising:

a common bus;

M input/output units, each of said M input/output units comprising:

level converter means for receiving the subscriber's signals and for converting the subscriber's signals to internal logic level signals;

a ROM and RAM circuit;

a first microprocessor, operatively connected to said input level converter circuit and said ROM and RAM circuit for executing the program written in the ROM with the RAM acting as main memory;

a programmable timer circuit, operatively connected to said first microprocessor, for generating N reference sampling pulse signals;

an interruption control circuit, operatively connected between said programmable timer circuit and said first microprocessor, for determining the priority in which said N reference sampling pulse signals are transmitted to said first microprocessor and for transmitting a selected one of said N reference sampling pulse signals to said first microprocessor as a channel interrupt request signal;

a unit address switch for setting a self address to transfer data to a time slot to which high speed data has been allotted;

an address decoder, operatively connected to said unit address switch, said common bus and said first microprocessor for decoding said self address signal from said unit address switch and for generating a non-maskable interrupt signal for transmission to said first microprocessor, said non-maskable interrupt signal providing interruption so that said first microprocessor transfers data in the form of a transfer data signal;

a bus driver receiver circuit, operatively connected to said common bus and said first microprocessor, for transferring data between said first microprocessor and said common bus; and a high speed data processing circuit, operatively connected to said common bus, comprising:

a second microprocessor, for multiplexing and separating the signals on M by N channels, for generating and detecting train patterns, and for generating address signals on M by N channels;

an address encoder circuit, operatively connected between said common bus and said second microprocessor, for encoding said address signals generated by said second microprocessor and for providing encoded address signals to said common bus for transmission to said address decoder circuit;

a bus driver receiver circuit, operatively connected between said second microprocessor and said common bus, for transferring data between said second microprocessor and each of said M input/out devices via said common bus.

6. A time division multiplex transmission circuit as set forth in claim 5, wherein said high-speed data processor circuit further comprises:

a ROM and RAM circuit operatively connected to said second microprocessor;

a high-speed transmission path operatively connected to the data transmission device; and a driver receiver circuit, operatively connected between said second microprocessor and said high-speed transmission path, for providing an interface between said second microprocessor and said high-speed transmission path.

7. A time division multiplex transmission circuit as set forth in claim 5, wherein said programmable timer circuit generates a timer interrupt request signal and wherein said non-maskable interrupt signal has first priority in the order of interruption of signals into said first microprocessor, said channel interrupt request signal has second priority and wherein said timer interrupt request signal has last priority.

* * * * *